Figure 1:
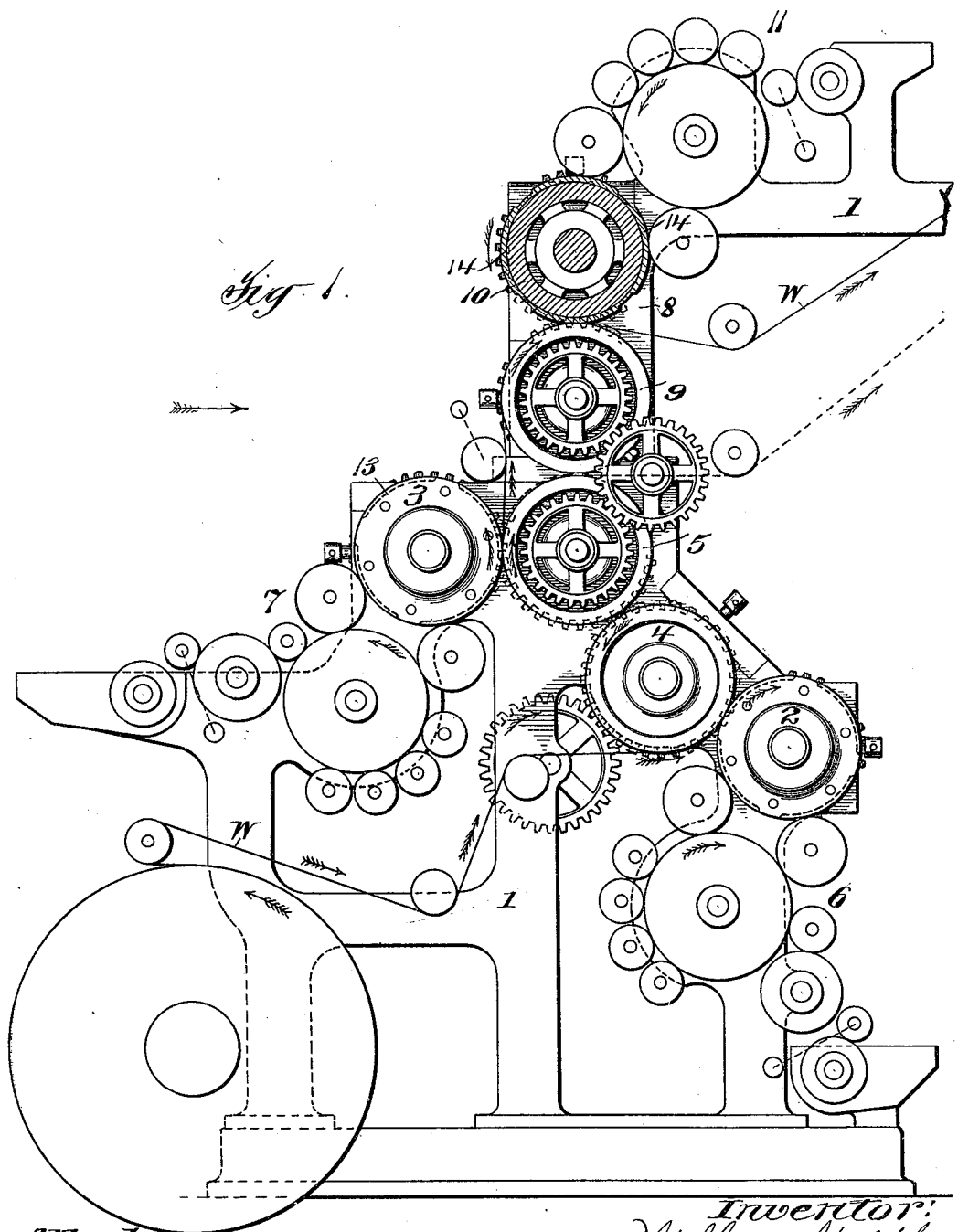

No. 636,861. Patented Nov. 14, 1899.
W. SPALCKHAVER.
WEB PERFECTING AND HALF TONE PRINTING MACHINE.
(Application filed Oct. 8, 1898.)
(No Model.) 2 Sheets—Sheet 1.

Attest:
G. F. Kehoe
J. A. Travis

Inventor:
William Spalckhaver
By Philipp Phelps & Sanger
Attys

No. 636,861. Patented Nov. 14, 1899.
W. SPALCKHAVER.
WEB PERFECTING AND HALF TONE PRINTING MACHINE.
(Application filed Oct. 8, 1898.)
(No Model.) 2 Sheets—Sheet 2.

UNITED STATES PATENT OFFICE.

WILLIAM SPALCKHAVER, OF NEW YORK, N. Y., ASSIGNOR TO ROBERT HOE, THEODORE H. MEAD, AND CHARLES W. CARPENTER, OF SAME PLACE.

WEB-PERFECTING AND HALF-TONE PRINTING-MACHINE.

SPECIFICATION forming part of Letters Patent No. 636,861, dated November 14, 1899.

Application filed October 8, 1898. Serial No. 692,992. (No model.)

*To all whom it may concern:*

Be it known that I, WILLIAM SPALCKHAVER, a citizen of the United States, residing at New York city, county of Kings, and State of New York, have invented certain new and useful Improvements in Web-Perfecting and Half-Tone Printing-Machines, fully described and represented in the following specification and the accompanying drawings, forming a part of the same.

This invention relates to certain improvements in printing-machines, and more particularly to machines intended to print from half-tone or process plates.

Half-tone plates are now widely used for illustrative purposes, not only in the finer classes of work, but also in newspaper-work, where they have almost entirely supplanted the old-style relief-plates. They are prepared by photographing the object which it is desired to illustrate through a ruled screen which usually consists of two pieces of plate-glass having fine lines ruled upon them, the lines being filled with an opaque pigment. These pieces of ruled glass are placed so that the lines on one plate cross the lines on the other plate, so as to produce a fine network. The screen thus prepared is placed in a camera immediately in front of the sensitive plate and the picture is taken. The photographic image on the negative is broken up into a grain, the tones being reproduced in the negative by a multitude of very small dots. The screens are ruled with various degrees of fineness, the degree of fineness of the ruling determining the size of the dots or grain-points and also the excellence of the picture. If a fine picture containing a great amount of detail and closely approximating the original in lights, shades, and intermediate tones be desired, very fine screens must be used. If, on the contrary, a coarse reproduction is all that is desired, much coarser screens can be used. The screens vary from, say, fifty-five lines to the inch for coarse work, such as poster-work, to one hundred and seventy-five lines to the inch, and sometimes even more, for very fine half-tone reproductions. The negative having been taken through the ruled screen, as above described, it is superposed on a sensitized zinc or copper plate and the picture is printed thereon. The plate is sensitized with a bichromatic film, generally of albumen, gelatin, gum, or fish-glue. The film after being exposed under the negative is developed by washing away the parts which have been protected from the light, the development being continued until the zinc is laid bare between the dots. The plate is then dried, and in the case of fish-glue, which is the medium now usually employed, the plate is heated until the glue is made sufficiently hard to form a "resist" for acid. The plate is now etched until the dots are made to stand in sufficient relief, so as to form a printing-surface.

It will be understood that in making a plate as above described if very coarse screens are used the etching can be continued much longer than if very fine screens are used. It is of course clear that the longer the plate is etched the greater the relief in which the dots will stand, and consequently the better the printing-surface from a typographic point of view, though not from an artistic point of view, since the coarse screens, as has been before stated, give resulting plates with very little detail in the picture. If, on the other hand, it be attempted to etch down a plate made with fine screens, so as to give it a high relief, the acid will undercut the dots and the plate will be ruined.

It will be readily seen that the problem of printing from plates prepared as has been heretofore described is totally different to that of printing from a relief-surface, such as type or stereotypes. With type and stereotypes the printer is dealing with surfaces of very considerable relief, whereas in printing from half-tone plates the relief, even in the coarsest plates, is exceedingly small. The conditions in the press, therefore, which conduce to successful printing from surfaces in high relief are not such as to produce successful prints in half-tone plates.

The finest half-tones are printed on special presses having inking devices which are entirely different to those used on ordinary presses and constructed to give an amount of evenness in the spread of the ink which is not attainable in the ordinary press. The cylinders are also specially constructed for keeping a steady impression between them in order to avoid any wear on the edges of the plates and also to insure that the surfaces run together in perfect unison, so as to avoid any wear on the plate, for it will be readily seen that if there is any drag between the cylinders the design, which lies upon the surface of the half-tone plate in a succession of minute dots, will be wiped off or marred and will show a black smut mark wherever such marring occurs. In newspaper-work, however, it is not practicable to use special machines for the half-tone plates for reasons which are obvious, and it has been customary, therefore, to mount the half-tone plates on a backing and inset them in various ways into the surface of the stereotype-plates from which the paper is printed. The result is that, because of the differences in conditions before noted, high-grade half-tone printing has not yet been attained in newspaper-machines. Only plates produced with coarse screens can be used, giving pictures with little detail, and even with these plates the pictures are blurred and indistinct instead of being sharp and clear. Another reason for the lack of success in printing from half-tone plates in newspaper-work is to be found in the difference between the impression-surfaces which must be used for successful work with stereotype and with half-tone plates. With stereotype-plates a blanket of more or less softness is used in order to compensate for inequalities in the plate due to variations in the height of the type from which the plate is cast and other slight unevennesses. A hard impression-surface, however, is a practical necessity for successful printing from half-tone plates, as with such a surface the paper picks up the ink clearly and sharply from the tops of the points of the plate, while a soft blanket allows the paper to be depressed, as it were, between the points and at the same time permits a slight drag or wiping action, which produces a blurred and smutted print. If, however, it be attempted to use as hard a blanket as should be used with half-tone plates with stereotype-plates, a perfect impression of the printed page would not result, because of the variations in the stereos heretofore referred to. Furthermore, there is an accuracy of gearwork on the special presses used for printing with half-tone plates which is not attained in presses designed to print from stereos, and any inaccuracy in the gears which will permit any unevenness of running between the printing and impression cylinders will also cause a drag and make a blurred picture.

It is the object of this invention to produce a printing-machine which shall combine the characteristics necessary for good half-tone printing and good stereotype-printing, so as to render it possible to produce a grade of half-tone work in rapidly-running printing-machines which has heretofore been regarded as practically impossible.

The invention consists in certain parts, improvements, and combinations to be hereinafter described, and fully pointed out in the claims hereunto appended.

Figure 2:
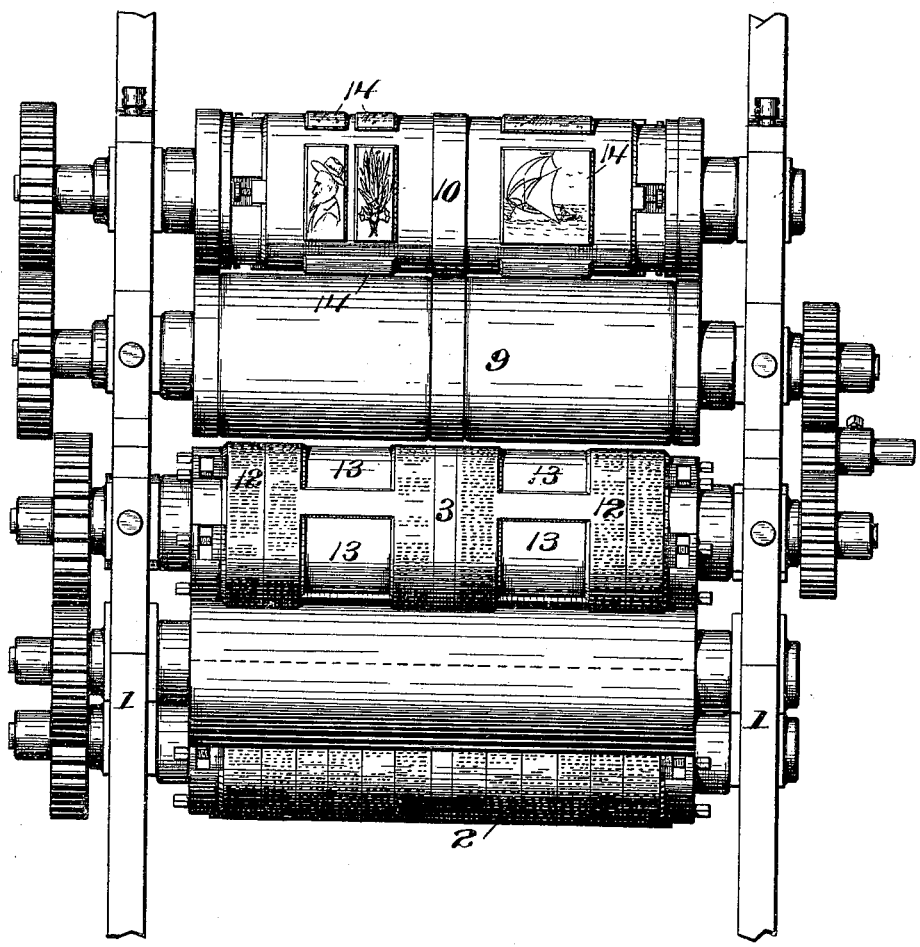

In the accompanying drawings, which constitute a part of this specification, and to which reference is to be had for an understanding of the invention, Figure 1 represents a side view of a press constructed to print both from stereotype-plates and half-tone, certain parts thereof being shown in section. Fig. 2 represents an end view of a part of the construction shown in Fig. 1.

In the machine which has been selected to illustrate this invention, 1 indicates the frame. Suitably located in this frame are two printing-couples, the type or plate cylinder of one of these couples being marked 2 and the type-cylinder of the other couple being marked 3. The impression members of each of these couples are marked 4 and 5, respectively. The type-cylinders of these couples are inked by any usual mechanism, as 6 and 7, and are so arranged that the web W is led from one to the other and is perfected in the usual way. These couples carry printing-surfaces formed from stereotype-plates, these plates being the same in all particulars as the ordinary stereotype, except in the particulars to be hereinafter noted.

The frame is provided with uprights 8, and in these uprights is mounted a printing-couple consisting of an impression member 9 and a printing or plate-carrying member 10. The plate-carrying member 10 carries only process or half-tone plates, these plates being inked from a suitable inking mechanism 11, mounted in the upper part of the machine. In this machine the arrangement is such that a half-tone is printed on the side of the web which is perfected or receives the last printing. The stereotype-plates 12 on the printing member 3 are cut away, so as to leave gaps or spaces 13, which will be unprinted as the web passes through. As the web is led to the couple from which the half-tone printing is to be done these unprinted spaces will register with the impression to be delivered by the half-tone plates 14, carried on the printing member 10. In other words, the web is printed by one pair of couples on one side and on the other side it is printed except on the spaces in which the half-tone cuts are to occur. It then passes on to the half-tone printing-couple, and the half-tone impressions are placed upon it in proper register.

By arranging the half-tone plates on a separate printing-couple a single organized machine is produced which will print both from half-tones and stereotype-plates and which has all the advantages of the special half-tone press, since, as will be readily seen, it is possible to regulate the inking, the packing of the impression-cylinder, and the gearwork in the way required by this peculiar printing-surface and the pressure. Thus all the conditions necessary to produce a perfect half-tone print can be easily established and this without in any way affecting the efficiency of the couples which carry the stereoplates. As a result half-tone plates made with screens of much finer ruling can be used than has heretofore been possible when the plates have been printed on the same cylinder with the stereos, and far better printing results are attained.

In case it is not desired to use the half-tone printing-couple the web may be led directly out of the machine, as shown in dotted lines in Fig. 1, the half-tone couple being thrown out of operation in any well-known manner.

While the half-tone couple has been shown in connection with a machine having only two printing-couples, it is obvious that a half-tone couple such as here described may be placed on any printing-machine, or in case it is desired to use half-tone plates printing in colors several such couples might be used.

What I claim is—

1. In an organized printing-machine, the combination with a pair of rotating printing-couples, the printing member of each couple being constructed to carry relief-plates and the couples being arranged to print on opposite sides of a sheet or web, the plates on the printing member of one couple being arranged so that a blank or unprinted space or spaces will be left on the sheet or web, of a second rotating printing-couple, the printing member of which is constructed to carry a half-tone plate or plates, said plate or plates being arranged to deliver an impression on the blank spaces left by the plates on the first couple, substantially as described.

2. In an organized printing-machine, the combination with a rotating printing-couple having stereotype-plates thereon, the said plates being cut out at certain parts, of a separate rotating printing-couple carrying half-tone or process plates arranged to print in the cut-out spaces left by the first couple, substantially as described.

In testimony whereof I have hereunto set my hand in the presence of two subscribing witnesses.

WILLIAM SPALCKHAVER.

Witnesses:
 JAMES Q. RICE,
 T. F. KEHOE.